(12) United States Patent
Krasnansky

(10) Patent No.: US 6,897,681 B2
(45) Date of Patent: May 24, 2005

(54) TIME DIVISION MULTIPLEXED SERIAL BUS WITH INCREASED BANDWIDTH

(75) Inventor: Keith Krasnansky, Germantown, MD (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 10/106,367
(22) Filed: Mar. 27, 2002

(65) Prior Publication Data
US 2003/0184341 A1 Oct. 2, 2003

(51) Int. Cl.[7] .................. H03K 17/16; H03K 19/0175
(52) U.S. Cl. ...................................... 326/82; 326/26
(58) Field of Search ............................ 326/26, 82, 86, 326/85, 90, 91

(56) References Cited

U.S. PATENT DOCUMENTS 5,440,247 A * 8/1995 Kaplinsky .................. 326/39
5,847,580 A * 12/1998 Bapat et al. ................. 326/82
5,973,506 A * 10/1999 Trimberger ................. 326/39
5,999,013 A * 12/1999 Elliott ........................ 326/16

OTHER PUBLICATIONS

Gerald Williams, "Digital Technology", 1981, Science Research Associates, Inc., Second Edition, p. 96, pp136–139.*

* cited by examiner

Primary Examiner—Daniel D. Chang
(74) Attorney, Agent, or Firm—Abdul Zindani; Wade James Brady, III; Frederick J. Telecky, Jr.

(57) ABSTRACT

The output of drivers which are used to drive the input signals to a multiplexed signal line are combined in a logic OR gate or a logic AND gate prior to connection to the input of the multiplexed line. The inactive state of drivers connected through a logic OR gate is set to 0 and the inactive state of drivers connected through a logic AND gate is set to 1. Bus contention between drivers is eliminated and the bandwidth of the multiplexed serial bus is increased because of the reduced wait time between driver transitions. Power dissipation in transition is reduced and the bus can have a programmable inactive state on a bus to allow for 1, 0 or High Z to indicate the inactive state.

11 Claims, 2 Drawing Sheets

TIME DIVISION MULTIPLEXED SERIAL BUS WITH INCREASED BANDWIDTH

CROSS REFERENCE TO RELATED APPLICATIONS

None

FIELD OF THE INVENTION

The present invention relates to signal interface management on a signal bus. More particularly, the present invention relates to placing signals on a shared serial bus in a manner that allows the serial bus to be shared on a time division multiplexed basis.

BACKGROUND OF THE INVENTION

Processors have input and output lines for communication of signals with other devices. Theses input and output lines are grouped into busses for communication of signals in parallel or serial communication. Drivers are connected to the input and/or output lines to drive signals on these lines. Often more than one driver is connected to a single line and the line is multiplexed to accept signals from different drivers. One form of multiplexing is accomplished by time dividing the input to the signal line so that each driver is provide one or more time slots for driving the signal line.

For example, as illustrated in FIG. 1, the digital telephony interface 5 to a DSP 6 in a voice over packet application is via the multichannel buffered serial port interface 7. The serial TDM bus 8 typically has several different sources driving the BDX signal from the DSPs 6 in the core 9 to the telephony circuit 5. Each DSP is assigned one or more timeslots on the time division multiplexed bus 8 and drives the BDX signal during this defined period. When a DSP is not driving the BDX signal, that DSP is in a high impedance state to allow another source to drive the BDX signal. There is a finite amount of time required to allow the first source to stop driving the BDX signal so that the next source can start driving the BDX signal. This time is required to allow the first source to achieve a high impedance state. The time required to switch sources limits the frequency (bandwidth) of the bus. Any clock frequency that is too high will cause contention on the bus.

Presently this problem is addressed by using logic gates to OR the signals together. This method has a significant disadvantage in that pull-down resistors must be used to drive the inactive signals low to the OR gate input. For high frequency busses, these pull-down resistors must have rather small resistances (200–500 Ohms) to pull the signal down quickly enough. This causes significant and unwanted power consumption.

SUMMARY OF THE INVENTION

The multiplexed serial bus interface of the DSP of the present invention is programmable such that the inactive state may be '1', '0', or hi-impedance. In cases where the frequency is low and the system uses a wire-OR'ed approach, the inactive state can be hi-impedance. In systems that require a high frequency that necessitates logically connecting the BDX signals together, the inactive state can be programmed to be '0' or '1'. If the inactive state is '0', the signals are connected with a logic OR gate. If an AND gate is used instead, the inactive state is programmed to be '1'.

This invention is not limited to the DSP multiplexed serial bus interface; it is applicable to any similar bus system. The advantages of using this invention include the elimination of pull-up and/or pull-down resistors thus reducing the wasting of power. The bandwidth of the interface is also maximized by reduction of wait times for line release.

BRIEF DESCRIPTION OF THE DRAWINGS

Exemplary embodiments of the present invention are discussed with reference to the following drawings.

DETAILED DESCRIPTION OF THE INVENTION

Figure 1:
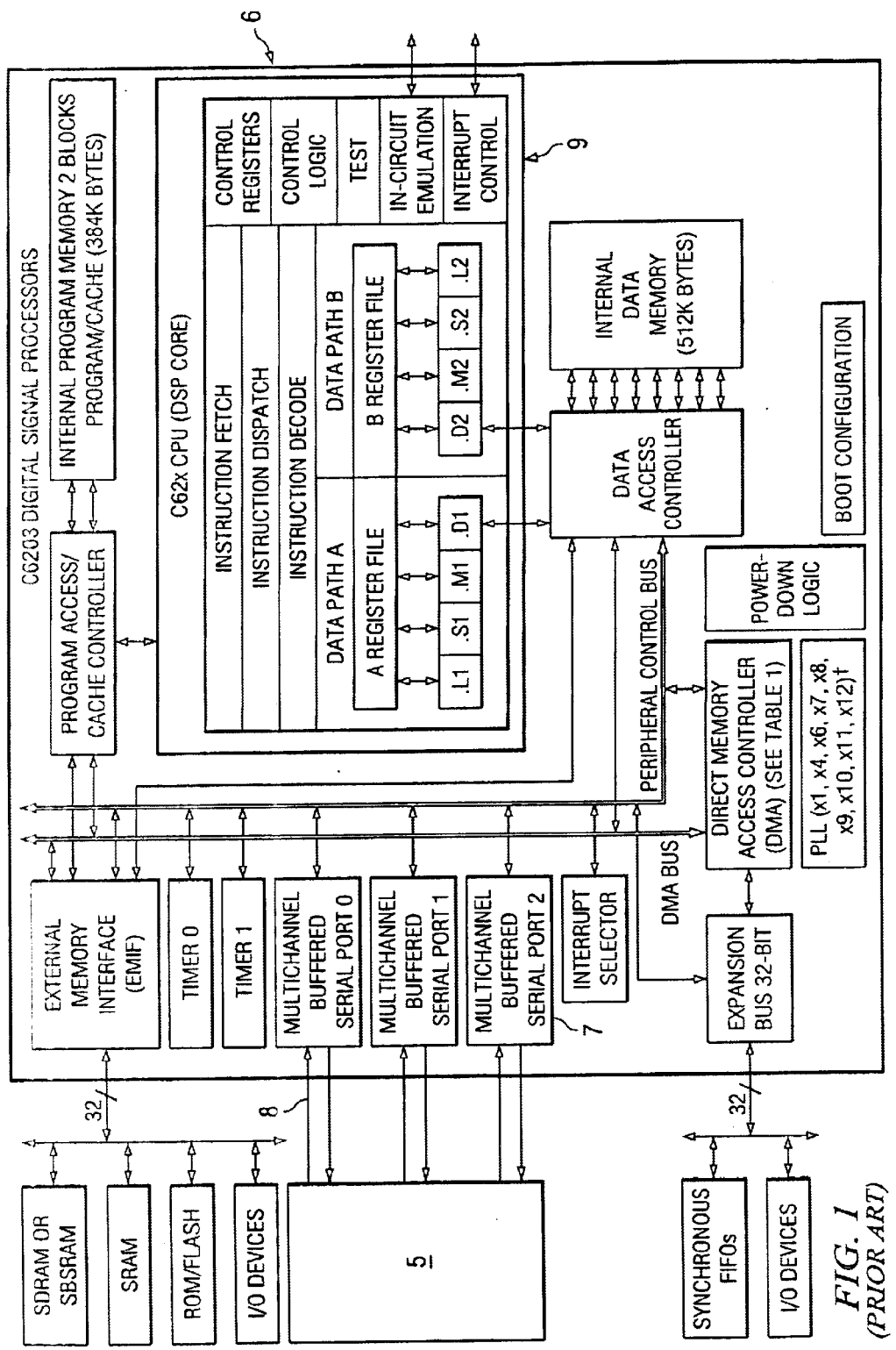
FIG. 1 is a block diagram illustrating the multichannel buffered serial port interface of a DSP.
Figure 2:
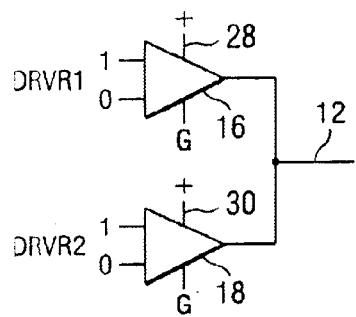
FIG. 2 is a block diagram illustrating the connection of two drivers to a multiplexed signal line input.

FIG. 2 illustrates a TDM bus 12 which transfers synchronous serial data according to a serial TDM bus clock 14. The data bus 12 may be driven by more than one source of data 16, 18. Each source 16, 18 is allocated one or more timeslots in which it can drive data onto the single line 12. When driving data, the source is in a low impedance state, driving either 1's or 0's by creating low impedance connections to the two power rails +V 28, 30 and ground (G) of the system. When it is not driving data, it maintains a high impedance path to both of the power rails +V 28, 30 and ground (G).

Figure 3:
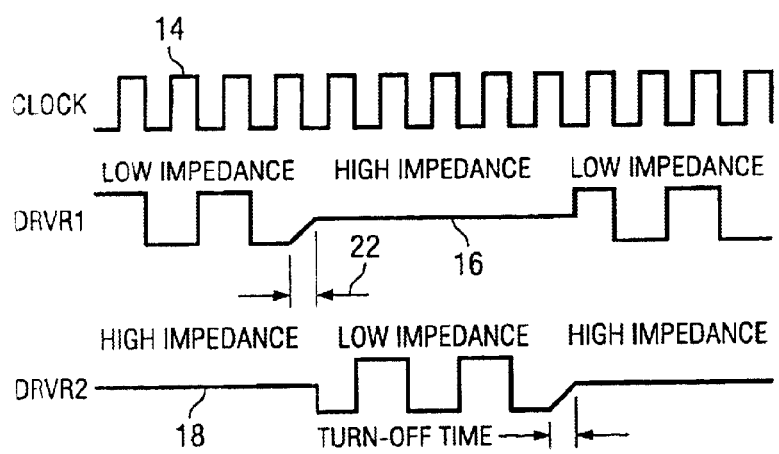
FIG. 3 is a timing diagram illustrating the multiplexed signals of FIG. 2.

As illustrated in the timing diagram of FIG. 3, the serial bus 12 is first driven by DRIVER1, followed by DRIVER2, followed by DRIVER1 again. Before DRIVER2 can drive data onto the bus 12, DRIVER1 must transition into its high impedance state to prevent bus contention between DRIVER1 and DRIVER2. Bus contention is a state in which two or more drivers are simultaneously trying to drive a signal on a common bus. The contending drivers simultaneously compete to drive the bus through low impedance paths. Bus contention causes indeterminate data to be driven on a signal line and can result in harmfully high currents being passed through the drivers if each driver is attempting to drive the line to a different level by establishing a low impedance connection to opposite power rails. The contending drivers are in effect shorting the two power rails together through their low impedance paths.

To avoid bus contention, each driver must wait until the previous driver turns off before it can start driving the bus. This turn-off time imposes a limit to the maximum frequency that the serial bus may transfer data.

The present invention reduces this turn-off time by taking advantage of the fact that the driver will switch to a predefined voltage rail much faster than it will switch to a high impedance state. In order to achieve a stable high impedance state, the driver must be turned off. This process of turning off the driving typically takes much longer than just changing the state of the output from '1' to '0' or from '0' to '1'.

By setting the off state of a driver to '0' instead of high impedance, the present invention reduces the time for a driver to reach the off state. The time for a driver to reach a stable state upon connection to either power rail is short in comparison to the time necessary to reach a high impedance state.

Figure 4:
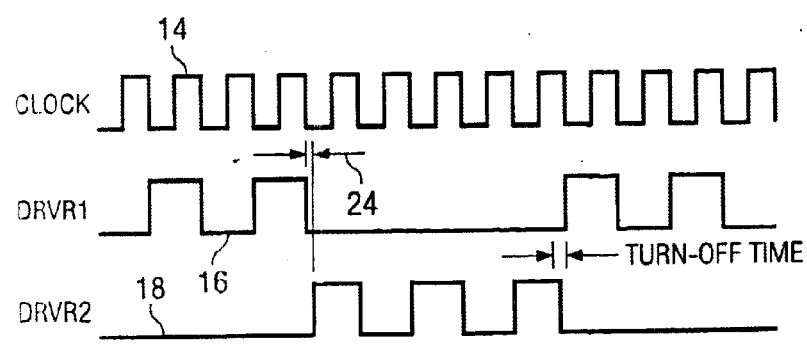
FIG. 4 is a timing diagram illustrating the multiplexed signals of FIG. 5.

In one embodiment, as illustrated in FIG. 4, the off state is maintained at a constant '0', substituted for the high impedance off state of the prior art. As illustrated in FIG. 3, the turn off time 22 for driver 16 is much longer than the turn off time 24 in FIG. 4, allowing for much shorter clock periods to exist in systems reflected by the timing in FIG. 4.

Figure 5:
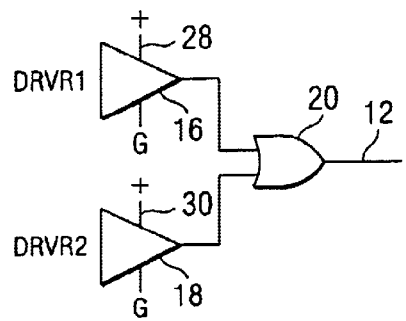
FIG. 5 is a block diagram illustrating the connection of two drivers to a multiplexed signal line according to an embodiment of the present invention.
Figure 5:
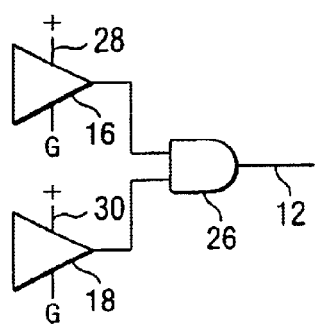

If the signals from the two drivers of FIG. 4 are combined as illustrated in FIG. 2, the bus 12 would remain in contention because the drivers would be contending to place a data signal of 1 or zero on the bus. As illustrated in FIG. 5, to eliminate bus contention, the two drivers 16 and 18, are sent through a logic OR gate 20. When one driver is in its off state and driving a zero to the OR gate 20, the output of the OR gate will reflect the input from the other driver. When driver 18 inputs a '0', a '0' from driver 16 will produce a '0' on line 12. Similarly, when driver 18 inputs an off state '0', a '1' from driver 16 will produce a '1' at line 12. Thus, OR gate 20 will cause the active driver signal to be reproduced on line 12 when the inactive driver is tied to logic '0' in its off state.

Bus contention can alternatively be eliminated by connecting the output of the two drivers 16 and 18, through a logic AND gate 26. When one driver is in its off or inactive state it drives a 1 to the AND gate 26, the output of the AND gate 26 will therefore reflect the input from the other driver. When one driver inputs an inactive '1', a '0' from the other driver will produce a '0' on line I 2. Similarly, when one driver inputs an inactive '1', a '1' from the other driver will produce a '1' at line 12. Thus, an AND gate 26 will cause the active driver signal to be reproduced on line 12 when the inactive driver is tied to logic '1' in its off state.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A signal adapter for a multiplexed serial signal line, comprising:

an OR gate for connecting a plurality of line drivers to said multiplexed signal line, comprising an output attached to the input of said multiplexed signal line, wherein said OR gate further comprises:
 a first driver input, connected to a first line driver of said plurality of line drivers, that receives a signal from said first line driver;
 a second driver input connected to a second line driver of said plurality of line drivers;
 a first power rail connected to said first line driver; and
 a second power rail connected to said second line driver,
 wherein each of said first line driver and said second line driver is allocated to one or more time-slots to drive data onto said multiplexed signal line,
 wherein, when said first and second line drivers connect to said corresponding first and second power rails at low impedance, said connected drivers drive the data, comprising either logic ones or logic zeros, to said output line of said signal adapter, and when said first and second line drivers are not driving the data, said corresponding first and second line drivers connect to said corresponding first and second power rails at high impedance, and
 wherein, when an off state of said second line driver is maintained at a logic zero, said OR gate reproduces the data driven by said first line driver onto said output.

2. The adaptor of claim 1, wherein:

each of said drivers is connected to a first power rail and to a second power rail, and each of said drivers connects either said first or second power rail to said respective driver input to drive said multiplexed line according to the data to be driven by said driver; and each of said drivers connects said first power rail to said respective driver input of said OR gate when said driver is in a non-driving state to provide a logical value of zero to said respective driver input of said OR gate.

3. The signal adapter of claim 1, wherein when said first line driver drives a logic zero in said off state to said OR gate and said second line driver drives a logic zero to said OR gate, said OR gate reproduces the logic zero, driven from said second line driver, onto said output.

4. The signal adapter of claim 1, wherein when said first line driver drives a logic zero in said off state to said OR gate and said second line driver drives a logic one to said OR gate, said OR gate reproduces the logic one, driven from said second line driver, onto said output.

5. A signal adapter for a multiplexed serial signal line, comprising:

an AND gate for connecting a plurality of line drivers to said multiplexed signal line, comprising an output attached to the input of said multiplexed signal line, said AND gate comprising:
 a first driver input connected to a first line driver of said plurality of line drivers for receiving a signal from said first line driver;
 a second driver input connected to a second line driver of said plurality of line drivers for receiving a signal from said second line driver;
 a first power rail connected to said first line driver; and
 a second power rail connected to said second line driver,
 wherein each of said first line driver and said second line driver is allocated to one or more time-slots to drive data onto said multiplexed signal line
 wherein, when said first and second line drivers connect to said corresponding first and second power rails at low impedance, said connected drivers drive data comprising either logic ones or logic zeros to said output line of said signal adapter, and
 when said first and second line drivers are not driving data, said corresponding first and second line drivers connect to said corresponding first and second power rails at high impedance, and
 wherein, when an off state of said second line driver is maintained at a logic one, said AND gate reproduces data driven by said first line driver onto said output.

6. The adaptor of claim 5, wherein:

each of said drivers connected to a first power rail and to a second power rail, and each of said drivers connects either said first or second power rail to said respective driver input to drive said multiplexed line according to the data to be driven by said driver; and each of said drivers connects said first power rail to said respective driver input of said AND gate when said driver is in a non-driving state to provide a logical value of one to said respective driver input of said AND gate.

7. The signal adapter of claim 5, wherein when said second line driver drives a logic one to said AND gate and said first line driver drives a logic zero to said AND gate, said AND gate reproduces the logic zero, driven from said first line driver, onto said output.

8. The signal adapter of claim 5, wherein when said second line driver drives a logic one to said AND gate and said first line driver drives a logic one to said AND gate, said AND gate reproduces the logic one, driven from said first line driver, onto said output.

9. A signal adapter for a multiplexed serial signal line, comprising:
- a first driver and second driver, each connected to a corresponding first power rail and second of power rail and a ground of said signal adapter; and
- an output line, connected to an input of the multiplexed serial signal line,
- wherein each said driver is allocated to one or more time-slots to drive data onto the output line of the signal adapter,
- wherein, when said drivers connect to said corresponding power rails at low impedance, said connected drivers drive data comprising either logic ones or logic zeros to said output line of said signal adapter, and when said drivers are pot driving data said drivers connect to said corresponding power rails at high impedance, and
- wherein, when the first driver maintains an off state and the second driver maintains an active state, the data driven by the second driver is reproduced onto the output line of the signal adapter.

10. The signal adapter of claim 9, wherein when said first line driver drives a logic zero in said off state and said second line driver drives a logic zero, said signal adapter reproduces the logic zero, driven from said second line driver, onto said output line.

11. The signal adapter of claim 9, wherein when said first line driver drives a logic zero in said off state and said second line driver drives a logic one, said signal adapter reproduces the logic one, driven from said second line driver, onto said output line.

* * * * *